United States Patent
Fisk et al.

(10) Patent No.: US 9,012,006 B2
(45) Date of Patent: Apr. 21, 2015

(54) MULTI-LAYER ASSEMBLY WITH RETENTION FEATURE

(75) Inventors: Jonathan W. Fisk, Canton, MI (US); Daniel J. Driscoll, Canton, MI (US); James F. Keys, Northville, MI (US)

(73) Assignee: Shiloh Industries, Inc., Valley City, OH (US)

(*) Notice: Subject to any disclaimer, the term of this patent is extended or adjusted under 35 U.S.C. 154(b) by 217 days.

(21) Appl. No.: 13/395,044

(22) PCT Filed: Sep. 27, 2010

(86) PCT No.: PCT/US2010/050388
§ 371 (c)(1),
(2), (4) Date: Mar. 8, 2012

(87) PCT Pub. No.: WO2011/038338
PCT Pub. Date: Mar. 31, 2011

(65) Prior Publication Data
US 2012/0171413 A1 Jul. 5, 2012

Related U.S. Application Data

(60) Provisional application No. 61/245,731, filed on Sep. 25, 2009.

(51) Int. Cl.
*B32B 3/10* (2006.01)
(Continued)

(52) U.S. Cl.
CPC ........... *B32B 3/06* (2013.01); *Y10T 428/24273* (2015.01); *Y10T 156/10* (2015.01);
(Continued)

(58) Field of Classification Search
CPC ........... G10K 11/168; B32B 2260/046; B32B 2250/03; B32B 2250/40; B32B 3/04; B32B 7/045; B32B 7/12; B32B 2307/102; B32B 2309/105; B32B 2311/24; B32B 2311/30; B32B 2605/003; B60G 13/003; B60R 13/08; B29C 65/4835; B29C 65/4845; B29C 66/73151; Y10T 74/2131; Y10T 156/10; Y10T 428/24273; Y10T 428/24851; F16B 11/006; F16B 15/08; G11B 33/08; G11B 17/038; G11B 19/2018
USPC .............. 428/403, 131, 212, 181; 156/92, 95, 156/290.291, 292; 52/716.5, 716.6; 24/297; 411/55, 44, 69
See application file for complete search history.

(56) References Cited

U.S. PATENT DOCUMENTS 3,909,927 A 10/1975 Steward
(Continued)

FOREIGN PATENT DOCUMENTS

DE 3151266 A1 7/1983
(Continued)

OTHER PUBLICATIONS

Written Opinion & International Search Report for PCT/US10/050388 Jun. 28, 2011, 8 pages.
(Continued)

*Primary Examiner* — Prashant J Khatri
*Assistant Examiner* — Travis Figg
(74) *Attorney, Agent, or Firm* — Reising Ethington P.C.

(57) ABSTRACT

A multi-layer assembly, such as a sound damping metal laminate used in the automotive industry, having first and second rigid layers and an adhesive layer in between. A retention feature in the form of a raised embossment may be formed in one or more of the rigid layers and may be located near a fastening hole, which accommodates a nut and bolt or some other type of fastening device. The retention feature may impart rigidity and improved stiffness to the multi-layer assembly in the area surrounding the fastening hole, and it may also create a space between the rigid layers that is generally devoid of adhesive from the adhesive layer. This, in turn, can improve the long term performance of the multi-layer assembly by addressing issues such as compression set, spring back and/or stress relaxation. Methods of manufacture and other embodiments are also provided, including ones that accommodate multiple fastening holes, have discontinuous retention features, and use welds in place of nuts and bolts, to name a few.

22 Claims, 3 Drawing Sheets

(51) Int. Cl.
| | | |
|---|---|---|
| B32B 3/14 | (2006.01) | |
| B32B 3/28 | (2006.01) | |
| B32B 7/02 | (2006.01) | |
| B32B 9/00 | (2006.01) | |
| B32B 7/08 | (2006.01) | |
| B32B 17/00 | (2006.01) | |
| B32B 7/14 | (2006.01) | |
| B32B 37/00 | (2006.01) | |
| B29C 65/00 | (2006.01) | |
| E04B 1/82 | (2006.01) | |
| E04C 2/38 | (2006.01) | |
| B32B 3/06 | (2006.01) | |
| B29C 65/56 | (2006.01) | |
| B32B 7/12 | (2006.01) | |
| B32B 15/04 | (2006.01) | |
| B32B 15/18 | (2006.01) | |
| B32B 15/20 | (2006.01) | |
| B60R 13/08 | (2006.01) | |
| B29C 65/48 | (2006.01) | |
| B32B 37/12 | (2006.01) | |
| F16B 11/00 | (2006.01) | |

(52) U.S. Cl.
CPC ...... *Y10T428/24851* (2015.01); *B29C 65/4835* (2013.01); *B29C 65/562* (2013.01); *B29C 66/73151* (2013.01); *B32B 7/12* (2013.01); *B32B 15/04* (2013.01); *B32B 15/18* (2013.01); *B32B 15/20* (2013.01); *B32B 37/12* (2013.01); *B32B 2307/102* (2013.01); *B32B 2309/105* (2013.01); *B32B 2311/24* (2013.01); *B32B 2311/30* (2013.01); *B32B 2605/003* (2013.01); *B60R 13/08* (2013.01); *B60R 2013/0807* (2013.01); *F16B 11/006* (2013.01); *B29C 65/4845* (2013.01); *B29C 65/48* (2013.01); *B29C 65/483* (2013.01)

(56) References Cited

U.S. PATENT DOCUMENTS

| | | |
|---|---|---|
| 5,353,571 A | 10/1994 | Berdan |
| 5,691,037 A | 11/1997 | McCutcheon |
| 6,177,173 B1 | 1/2001 | Nelson |
| 2001/0014009 A1* | 8/2001 | Yagenji et al. ............... 361/685 |
| 2004/0016111 A1 | 1/2004 | Mueller et al. |
| 2005/0039948 A1 | 2/2005 | Asai et al. |
| 2005/0042421 A1 | 2/2005 | Schwarzwalder et al. |

FOREIGN PATENT DOCUMENTS

| | | | | |
|---|---|---|---|---|
| DE | 4217513 A1 | 12/1992 | | |
| DE | 10227495 A1 | 1/2003 | | |
| JP | 59-128064 | 7/1984 | | |
| JP | 359128064 | 7/1984 | | |
| JP | S60193063 U | 12/1985 | | |
| JP | S62100320 U | 6/1987 | | |
| JP | H0344519 U | 4/1991 | | |
| JP | H04366999 A | 12/1992 | | |
| JP | 06015744 A | * 1/1994 | ............. | B29C 65/56 |
| JP | H0796571 A | 4/1995 | | |
| JP | 2001012440 | 1/2001 | | |
| JP | 2001012440 A | 1/2001 | | |
| JP | 2003108145 | 4/2003 | | |
| WO | WO87/02745 A1 | 5/1987 | | |
| WO | WO8702745 A1 | 5/1987 | | |
| WO | WO2009/068855 A1 | 6/2009 | | |

OTHER PUBLICATIONS

European Search Report dated Nov. 28, 2013, 6 pages.
Japanese Office Action, dated Jul. 15, 2014, 4 pages.
Japanese Office Action, dated Jul. 15, 2014, 4 pages—translated.
Mexican Office Action dated Dec. 9, 2014, 3 pages.

* cited by examiner

MULTI-LAYER ASSEMBLY WITH RETENTION FEATURE

REFERENCE TO RELATED APPLICATIONS

This application claims the benefit of U.S. Provisional Ser. No. 61/245,731 filed on Sep. 25, 2009.

FIELD OF INVENTION

The present invention generally relates to multi-layer assemblies and, more particularly, to multi-layer assemblies that include one or more rigid and adhesive layers, such as those used in sound damping laminates and other structures.

BACKGROUND

A potential challenge when using sound damping laminates can involve the matter of attachment, whether it be attachment of the laminate to some support structure or attachment of some device to the laminate. Most sound damping laminates include a pair of rigid layers that sandwich a sound damping adhesive layer. The adhesive layer may experience a stress relaxation or compression set over time. If a nut and bolt are used to attach the sound damping laminate to a support structure, for example, it is possible that the amount torque, pressure, stress and/or fastening force of that attachment can diminish as time goes on. This phenomenon may be caused by the compression that the nut/bolt combination exerts on the sound damping laminate, which can cause the adhesive layer to be slowly squeezed out of the surrounding vicinity over time. The loss of some of the adhesive layer in this area—in addition to other factors such as compression set, stress relaxation, spring back, etc. in the various layers and components involved—can cause the nut/bolt combination to become loose.

SUMMARY

According to one aspect, there is provided a multi-layer assembly comprising: a first rigid layer; a second rigid layer; an adhesive layer that is in contact with the first and second rigid layers such that the adhesive layer bonds the first and second rigid layers together; and a retention featured that is formed in at least one of the first and second rigid layers and includes a side wall. The side wall extends away from the adhesive layer such that a space is formed between the first and second rigid layers, and the space is devoid of adhesive from the adhesive layer.

According to another aspect, there is provided a multi-layer assembly comprising: a first rigid layer that is made of metal and has an inner surface; a second rigid layer that is made of metal and has an inner surface; an adhesive layer that is in contact with the inner surfaces of the first and second rigid layers such that the adhesive layer bonds the first and second rigid layers together; and a retention feature that is formed in at least one of the first and second rigid layers. Attachment of a fastening device to the multi-layer assembly causes a deformation of the retention feature such that the inner surfaces of the first and second rigid layers contact each other and form a metal-to-metal interface that is devoid of adhesive from the adhesive layer.

According to another aspect, there is provided a method for forming a multi-layer assembly. The method may comprise the steps of: (a) providing first and second rigid layers; (b) forming a retention feature in at least one of the first and second rigid layers; (c) applying an adhesive layer to the at least one of the first and second rigid layer in which the retention feature is formed, wherein adhesive from the adhesive layer is not applied to the underside of the retention feature; and (d) bringing the first and second rigid layers together and curing the adhesive layer to form the multi-layer assembly.

DESCRIPTION OF THE DRAWINGS

A preferred exemplary embodiment of the invention will hereinafter be described in conjunction with the appended drawings, wherein like designations denote like elements, and wherein.

DESCRIPTION OF PREFERRED EMBODIMENT

Consider the example of a multi-layer assembly that is provided in a laminate form where two outer metal layers sandwich an adhesive layer in the middle; such assemblies are oftentimes used as sound damping structures. When a nut/bolt combination or other fastening device passes through a hole in the multi-layer assembly and clamps the different layers together, the compressed area surrounding the hole may experience a compressive force. The compressive force acts on the adhesive layer and may, over a period of time, cause it to be squeezed out or extrude from beneath the nut/bolt combination and take a permanent compression set. With the adhesive layer squeezed or pushed out of the surrounding area or experiencing a permanent compression, the overall thickness of the multi-layer assembly is reduced and the amount of torque on the nut/bolt combination can diminish over time. Thus, the retention features described below may be added to a multi-layer assembly, such as a sound damping structure, in order to prevent or reduce a loss of torque that may otherwise occur near a fastening device. Multi-layer assemblies such as these may be used in a whole variety of applications including, but certainly not limited to, household appliances like washing machines, dryers, ovens, dishwashers, and microwaves; vehicle components like dash panels or firewalls, hoods, roofs, deck lids, door panels, spare wheel tubs, trunk floors, wheel houses, floor pans, and oil pans; agricultural equipment; lawn and garden equipment; and electronic equipment like disk drives, to name a few. Oftentimes, multi-layer assemblies are used for improved vibration or sound damping purposes, thermal insulation, added structural integrity, etc.

Figure 1:
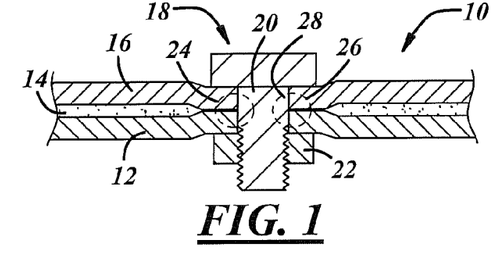
FIG. 1 is a cross-sectional view of an exemplary multi-layer assembly lacking a retention feature.

Referring to FIG. 1, there is shown an exemplary illustration of the squeezing and resulting torque reduction issue discussed above, which may occur in a multi-layer assembly 10 that does not have the present retention feature. Multi-layer assembly 10 is provided with a first rigid layer 12, an adhesive layer 14, and a second rigid layer 16. When a fastening device 18, such as a nut/bolt combination with a bolt 20 and a nut 22, is initially torqued-down on multi-layer assembly 10, the bolt elongates somewhat in its lengthwise direction and must remain elongated in order to maintain the intended torque. The compressive forces exerted by the nut/bolt combination can sometimes squeeze or push some of adhesive layer 14 out of areas 24, 26 which surround fastening hole 28; this allows bolt 20 to contract somewhat towards its original length. Thus, over time, the overall thickness of multi-layer assembly 10 at areas 24, 26 may become somewhat thinner than other non-compressed areas of the assembly, and this in turn may result in a reduction in the torque of fastening device 18. A loss or reduction in torque may be undesirable and could result in the fastening device coming loose or otherwise being less effective. It should be appreciated that the drawings, including FIG. 1, are only provided for purposes of illustration and that the actual deformation and material response that is experienced by the multi-layer assembly may differ from that illustrated therein.

According to the exemplary embodiment shown here, multi-layer assembly 10 is a laminate or sandwich-like construction and includes first rigid layer 12, adhesive layer 14, and second rigid layer 16. Of course, the retention features described below may be used with other multi-layer assemblies having other constructions, layers, layer combinations, etc., and are not limited to the exemplary multi-layer assembly shown here. Generally, adhesive layer 14 bonds first and second rigid layers 12, 16 together and can, depending on its composition and the particular application in which it is used, perform other functions such as vibration and/or noise damping. According to one exemplary embodiment, adhesive layer 14 is a viscoelastic adhesive layer that is comprised of an acrylate-based thermoset resin and has a thickness of about 0.005 mm-0.05 mm, inclusive; however, other adhesive compositions and thicknesses may be used as well. For reasons that will become clearer below, adhesive layer 14 may be a non-solvent-based or 100% reactable material, as opposed to a solvent-based material that includes a carrier or solvent component which evaporates out of the adhesive over time. First and second rigid layers 12, 16 may be made from any number of different materials, including hard plastics and metals such as stainless steel, galvanized steel, cold rolled steel (non-coated, coated, painted, etc.), aluminum, and alloys thereof. And, depending on the materials used, first and second rigid layers 12, 16 can originate from a coil of rolled stock material or from flat blanks that have already been blanked, trimmed, stamped, or otherwise metalworked into individual pieces—these different possibilities are described below in more detail. According to an exemplary embodiment, each of the first and second rigid layers 12, 16 is a metal layer and has a thickness of about 0.10 mm-1.00 mm, inclusive; of course other materials and other thicknesses are possible as well.

In different embodiments, multi-layer assembly 10 may be provided in a patch form or in a laminate form. In an exemplary patch form where the first rigid layer 12 is a part or component that is to be strengthened and/or damped and the second rigid layer 16 is a smaller patch, the second rigid layer can be adhered to the larger first rigid layer in a particular area that requires stiffening and/or vibration damping. Also, multiple separate and distinct second rigid layer patches or pieces can be adhered to the first rigid layer at different locations. In an exemplary laminate form, on the other hand, the second rigid layer 16 is a single piece that covers the entire first rigid layer 12. Other embodiments, beyond the exemplary patch and laminate forms described here, could also employ the retention features described herein. For instance, it is possible for the multi-layer assembly to have a different number and/or combination of layers, including combinations that have a fewer or greater number of layers than the exemplary embodiments shown here.

Fastening device 18, such as the nut/bolt combination shown here, may be used with multi-layer assembly 10 in order to strengthen the bond or joint between the various layers of the assembly, to secure other components to the multi-layer assembly (e.g., a brake booster could be secured to a multi-layer vehicle firewall, in which case one or more fastening devices would be needed), and/or to attach or mount the multi-layer assembly to some other structure (e.g., a multi-layer vehicle firewall could be mounted to one or more vehicle cross members or other vehicle frame members), to cite several possibilities. A "fastening device," as used herein, broadly includes any type of device, component, etc. that engages a multi-layer assembly and creates some type of mechanical lock, such as those described above. Some non-limiting examples of fastening devices include: nuts/bolts, screws, nails, rivets, clamps, spot welds, etc.

Figure 2:
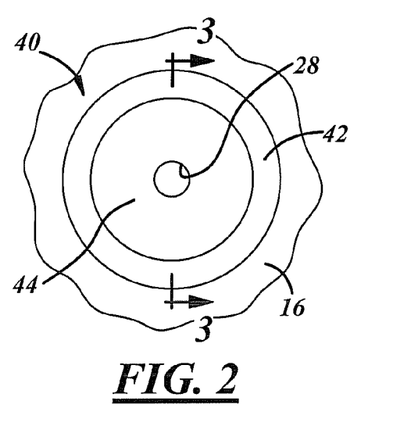
FIG. 2 is a top-down view of an exemplary multi-layer assembly having a retention feature.
Figure 3:
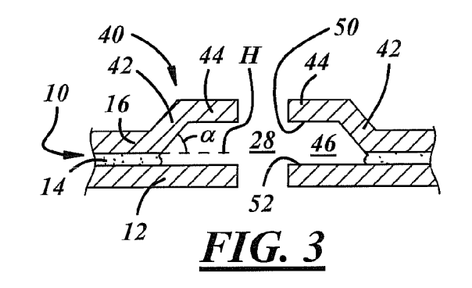
FIG. 3 is a cross-sectional view of the multi-layer assembly of FIG. 2, where a fastening device has not been attached to the multi-layer assembly.
Figure 4:
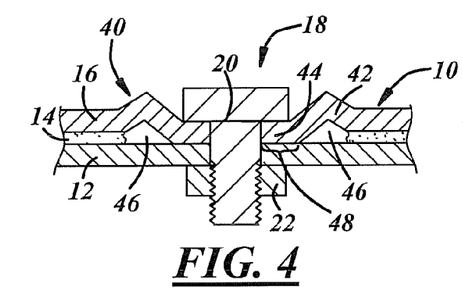
FIG. 4 is a cross-sectional view of the multi-layer assembly of FIG. 2, where a fastening device has been attached to the multi-layer assembly.

Referring now to FIGS. 2-4, one potential solution to the torque reduction issue discussed above involves exemplary retention feature 40, which is formed in one or more layers of multi-layer assembly 10 and is located near fastening hole 28. Retention feature 40 may impart rigidity and improved stiffness to the area surrounding fastening hole 28 and it may also prevent adhesive layer 14 from being applied in the areas surrounding the fastening hole and thus avoid the problem of the adhesive being squeezed or pushed out when fastening device 18 is torqued down. Retention feature 40 may be formed in first rigid layer 12 and/or second rigid layer 16, and can come in many different forms. In a first exemplary embodiment, retention feature 40 is an embossment, indentation, protuberance, or some other type of contoured feature and it is formed only in second rigid layer 16 such that it surrounds fastening hole 28 (see FIG. 3). From a top-down perspective, retention feature 40 may have a configuration that is circular (as shown in FIG. 2), oval, square, rectangular, or any other suitable shape. In this particular embodiment, retention feature 40 is a generally circular, raised embossment that surrounds fastening hole 28 and includes a side wall 42 and a top wall 44. Retention feature 40 helps form a space 46 between first and second rigid layers 12, 16 that is devoid of adhesive from adhesive layer 14.

Side wall 42 constitutes the outer perimeter of retention feature 40, and raises top wall 44 above the otherwise unraised portions of second rigid layer 16 which are located beyond the side wall. Upon torque-down of the nut/bolt combination, side wall 42 may provide some resistance to deformation of retention feature 40 that may otherwise occur due to the compressive forces exerted by bolt 20 and nut 22. According to the embodiment shown here, side wall 42 is connected to the unraised portions of second rigid layer 16 at one end (an outer radial end of the side wall) and is connected to top wall 44 at another end (an inner radial end of the side wall). An angle α may be formed between side wall 42 and a horizontal axis H of the unraised portions of second rigid layer 16. Angle α can have different values including a 45° angle as shown or a 90° angle which is not shown (e.g., angle α may be in a range from 20°-90°, inclusive). It should be appreciated that while side wall 42 is shown here rising from the unraised portions of second rigid layer 16 in a generally linear manner, the side wall could instead be provided with a convex, domed, ribbed, or other type of configuration.

Top wall 44 extends from side wall 42 and may constitute an interior portion of retention feature 40; that is, the portion that is generally closest to and surrounds fastening hole 28. Upon torque-down of the nut/bolt combination, top wall 44 is directly contacted by the underside of the head of bolt 20 or by a washer or the like (not shown). According to the embodiment shown here, top wall 44 is a generally annular surface that is connected to side wall 42 at one end (an outer radial end of the top wall) and is adjacent the fastening hole at the other end (an inner radial end of the top wall). Top wall 44 may be parallel with horizontal axis H and thus parallel with at least one of the first and second rigid layers 12, 16. Space 46 is located underneath side wall 42 and/or top wall 44 and may be devoid of adhesive material from adhesive layer 14, as will be subsequently described in more detail. Put differently, space 46 may be formed between an inner surface 50 of second rigid layer 16 and an opposing inner surface 52 of first rigid layer 12 and, according to this particular embodiment, surrounds fastening hole 28 (see FIG. 3). It is also possible for top wall 44 to be omitted in whole or in part such that the inner radial end of side wall 42 terminates at or opens to fastening hole 28.

As a general matter, the exact shape and size of retention feature 40 can vary significantly and depends on, among other things, the shape and size of the corresponding fastening device 18 and/or fastening hole 28. For example, retention feature 40 may be configured to completely or largely surround fastening hole 28 and to permit a compression of first and/or second rigid layers 12, 16 upon attaching or tightening a nut/bolt combination so that a metal-to-metal interface 48 is established at inner surfaces 50, 52 (see FIG. 4) which is devoid of adhesive from adhesive layer 14. Because of retention feature 40, there is little or no adhesive material from adhesive layer 14 in the area surrounding fastening hole 28 (i.e., space 46). Thus, tightening down fastening device 18 does not result in the adhesive material being squeezed or pushed out of metal-to-metal interface 48 over time, like it can with other multi-layer assemblies that have no such retention features (see FIG. 1). Accordingly, the springback or reaction force exerted by multi-layer assembly 10 against the compressive force of fastening device 18 does not diminish as much over time due to a loss of material and a corresponding reduction in the thickness of the assembly. It should be appreciated from the exemplary illustration of FIG. 4 that side wall 42 may or may not be significantly deformed after fastening device 18 is tightened down. This too may contribute to an improved springback on the part of retention feature 40. Accordingly, retention feature 40 may improve the performance of fastening device 18 over time by both reducing torque loss due to the gradual squeezing out of adhesive material (compression set) and by increasing the springback force of the multi-layer assembly (similar to a compression washer). Although FIG. 4 shows an exemplary retention feature that is deformed so that metal-to-metal interface 48 is established between first and second rigid layers, this is not necessary as the two rigid layers do not have to contact one another.

Figure 5:
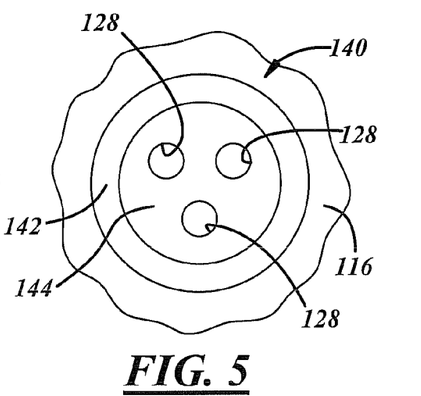
FIG. 5 is a top-down view of another exemplary multi-layer assembly having a retention feature, where the retention feature shown here is designed to accommodate several fastening devices.

Referring now to FIG. 5, a second exemplary embodiment of a retention feature 140 is shown that is in some ways similar to retention feature 40 of the first exemplary embodiment. One difference is that retention feature 140 is designed to accommodate more than one fastening hole 128, meaning that the retention feature can be physically larger in size and/or the fastening holes can be physically smaller in size than those of the previous embodiment. In this embodiment, retention feature 140 is an embossment, indentation, protuberance, or some other type of contoured feature and it is formed in second rigid layer 116 such that it surrounds multiple fastening holes 128. From the top-down perspective of FIG. 5, retention feature 140 has a configuration that is circular, but it can instead be oval, square, rectangular, or another suitable shape. And like retention feature 40, retention feature 140 may be a raised embossment with a side wall 142 and a top wall 144 that create a space (not shown) between the first and second rigid layers. These components are similar to those in the first exemplary embodiment and thus are not described here.

In cases where retention feature 140 has a top wall 144 with a large surface area, it may be difficult to punch out fastening holes 128 once the retention feature is formed due to the lack of support underneath the rather large top wall. One way to address such a situation is to resistance or spot weld the inner surfaces of the first and second rigid layers together at top wall 144 before punching out fastening holes 128. For example, the following exemplary process could be used: first, form retention feature 140 in the first and/or second rigid layer; next, apply an adhesive layer to the inner surface or underside of the rigid layer that includes retention feature 140 (this results in the retention feature being generally devoid of adhesive as a roller or other tool simply passes over the indentation created by the retention feature; this is explained below in more detail); the first and second rigid layers are then brought together so that the adhesive layer can set or cure; next, retention feature 140 is resistance welded to the opposing rigid layer at one or more spot welds on top wall 144 so that there are one or more metal-to-metal interfaces between the first and second rigid layers; and finally, the different nut/bolt combinations or other fastening devices could be inserted through fastening holes 128 and installed on the multi-layer assembly. Of course, the preceding process is only one possibility, as other processes and sequences of steps could be used instead.

Figure 6:
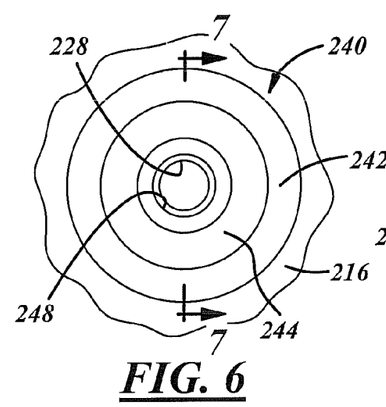
FIG. 6 is a top-down view of another exemplary multi-layer assembly having a retention feature, where the retention feature shown here includes an additional inner side wall.
Figure 7:
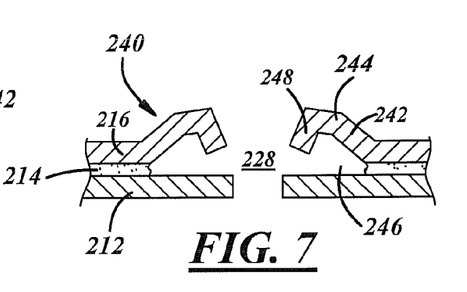
FIG. 7 is a cross-sectional view of the multi-layer assembly of FIG. 6, where a fastening device has not been attached to the multi-layer assembly.
Figure 8:
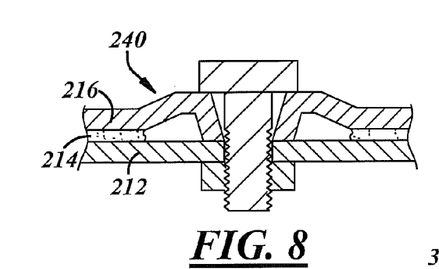
FIG. 8 is a cross-sectional view of the multi-layer assembly of FIG. 6, where a fastening device has been attached to the multi-layer assembly.

Referring now to FIGS. 6-8, a third exemplary embodiment of a retention feature 240 is shown that is in some ways similar to retention feature 40 of the first exemplary embodiment. One difference is that retention feature 240 has an outer side wall 242, a top wall 244, and an additional inner side wall

248, and creates a space 246 with an underlying first rigid layer 212. Outer side wall 242 and top wall 244 are similar to side wall 42 and top wall 44, respectively, of the first exemplary embodiment and thus are not separately described here. Inner side wall 248 is connected to top wall 244 at one end (outer radial end of the inner side wall) and extends downwards towards second rigid layer 212. Inner side wall 248 can be angled similarly to outer side wall 242, as already described with reference to side wall 42, although it can be angled differently as well. In this embodiment, a single fastening hole 228 is provided just within the interior of retention feature 240, and space 246 is located underneath outer side wall 242, top wall 244, and inner side wall 248, and is generally devoid of an adhesive layer 214. From the top-down perspective of FIG. 6, retention feature 240 has an annular configuration but it could be oval, rectangular, square, elliptical, or another suitable shape.

Figure 9:
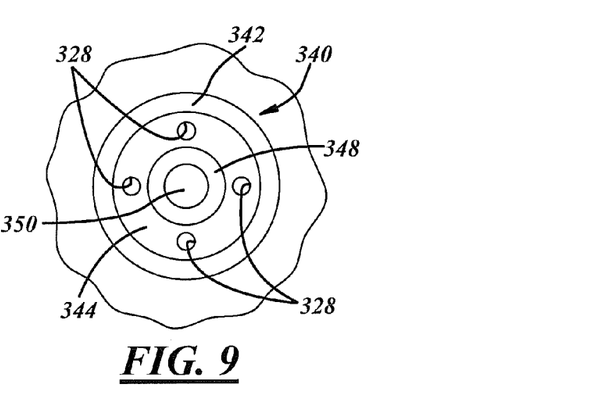
FIG. 9 is a top-down view of another exemplary multi-layer assembly having a retention feature, where the retention feature shown here is designed to accommodate several fastening devices.

Referring now to FIG. 9, a fourth exemplary embodiment of a retention feature 340 is shown that is in some ways similar to retention feature 240 of the third exemplary embodiment. One difference is that retention feature 340 is designed to accommodate multiple fastening holes 328 where each of the fastening holes is actually formed in a top wall of the retention feature, as opposed to being formed in the center and having the top wall surround the hole. In this particular embodiment, there is no fastening hole in the center of retention feature 340, as the flat center section 350 is an unraised portion of the second rigid layer. Retention feature 340 may be a raised annular embossment with an outer side wall 342, a top wall 344, and an inner side wall 348, and creates a space with an underlying first rigid layer. The fastening holes 328 are actually formed in the annular top wall 344. As explained earlier, it is possible for one or more resistance or other types of welds to be placed on flat center section 350 such that the first and second rigid layers are welded together at that spot. This is an example where the fastening devices may include both nuts/bolts and welds. From the top-down perspective of FIG. 9, retention feature 340 has an annular configuration but could be rectangular, elliptical, or another suitable shape.

Figure 10:
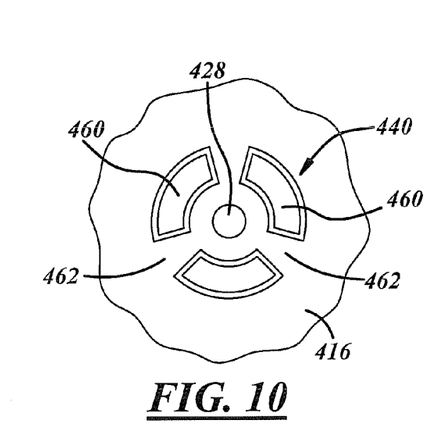
FIGS. 10-12 are top-down views of other exemplary multi-layer assemblies having retention features, where each of the retention features is designed to accommodate a single fastening device.
Figure 11:
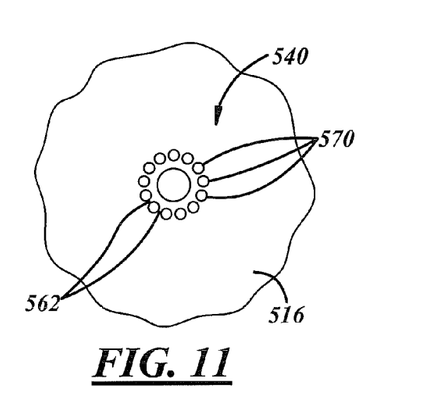
Figure 12:
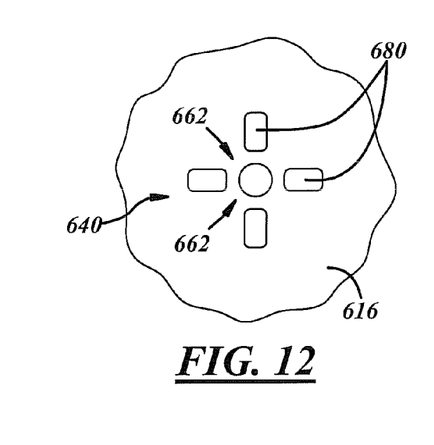

In other exemplary embodiments, the retention feature need not have an unbroken or continuous shape as in the previous embodiments and instead can be discontinuous with multiple separate and distinct raised components. For example, in FIG. 10 retention feature 440 has multiple arc-shaped features 460 formed in a second rigid layer 416 with unraised portions 462 located between each of the arc-shaped raised portions. Arc-shaped features 460 are shown spaced around a single fastener hole 428, but multiple fastener holes could be located in and around the features, as illustrated in FIGS. 5 and 9, for example. In FIG. 11, retention feature 540 has a number of dimple-shaped raised portions or protrusions 570 that are formed in a second rigid layer 516 with unraised portions 562 located between each of the raised portions. And in another embodiment shown in FIG. 12, retention feature 640 has multiple oblong-shaped raised portions 680 formed in a second rigid layer 616 with unraised portions 662 located therebetween. In each of the preceding discontinuous embodiments, there may be a slight amount of adhesive located in between the various raised features or portions 460, 570, 680 and the respective fastening holes; a situation that could give rise to concern about compression set, as discussed above. However, because the compressive force exerted by the fastening device, whether it be a nut/bolt combination or a weld, will concentrate on the raised portions, it is likely that more of the adhesive located between such features and the fastening holes would be squeezed out during the installation of the fastening device, as opposed to being squeezed out slowly over time following such installation. This in turn may mitigate the compression set effect and any resultant torque-reduction. Other embodiments, configurations, arrangements, shapes, etc. are also possible.

The above-described retention feature embodiments are designed to avoid or at least reduce the application of adhesive to certain areas in and/or around the retention features during the manufacturing process of the multi-layer assembly, which reduces the potential loss of torque issue at the area surrounding the fastening hole. The exact manufacturing process can vary and will depend in part on whether the multi-layer assembly is provided in patch form or laminate form, among other factors.

In an exemplary patch form manufacturing process, the first and/or second rigid layers can be formed into appropriately sized pieces or patches by a blanking process, a stamping process, or any other suitable process. The particular retention feature can be formed in the first and/or second rigid layer before, during, or after the blanking process by a stamping process such as a coining, embossing, or another suitable process.

After the retention feature is formed, the adhesive layer can then be applied to the rigid layer by a roll-coating process or the like. In an exemplary roll-coating process, the adhesive layer is applied to the inner surface of the rigid layer by way of a roller that is wheeled over the inner surface and makes contact with the surface where it is not recessed due to the retention feature; i.e., the unraised portions of the rigid layer. Where it is recessed, such as at the retention feature, the inner surface of the rigid layer is spaced away from the roller as it wheels over the retention feature and the adhesive material on the roller is not painted or applied to underside of the recess. It is also possible, for example, for the adhesive layer to be applied with a draw down bar or other material application technique, or to be prepared and cut into thin strips of adhesive so that the film-like strips can be applied to the first and/or second rigid layer. It may be desirable for the adhesive layer to be a non-solvent-based or 100% reactable material, as opposed to a solvent-based material that includes a carrier or solvent component that evaporates out of the adhesive over time. Materials that are 100% reactable are usually thinner than corresponding solvent-based layers because they do not have the solvent or carrier component that can account for about half of the overall thickness of the adhesive layer. Accordingly the retention features do not have to be recessed as much (i.e., they can be shallower) and still avoid adhesive during the application process. If the adhesive layer is provided as a film layer, it is possible to die cut, laser cut or otherwise form holes in the thin adhesive layer before or after applying it to one of the rigid layers, where the holes are specifically located at the fastening hole locations. Such a technique usually requires a fairly high level of precision. This way, no or little adhesive is located in the area surrounding the fastening hole, thus avoiding some of the obstacles identified above.

Once the adhesive layer is applied, the combined rigid/adhesive layer is brought into contact with the inner surface of the other rigid layer so that the adhesive can harden, cure, and/or bond the layers together. Heat treatments, ultraviolet (UV) radiation, pressure application, anaerobic and other known methods may be used to cure the adhesive layer. At this point, the adhesive layer 14 is present between the first and second rigid layers 12, 16, but is generally absent in the areas of the retention feature. Then, an optional stamping or other metalworking process can be used to further form and/or shape the multi-layer assembly itself; for example, shape the multi-layer assembly into a finished part or component. It is possible for the stamping or other metalworking process to flatten out the retention features—now that the adhesive layer has been applied, cured and is absent from the area surrounding the fastening hole—so that they are returned to their initial shape. In fact, depending on the requirements of the application, the retention features may be flattened back down or smoothed over such that they are not easily visible. A piercing process, or other suitable process, can be performed in order to put one or more fastening holes in the first and second rigid layers. The piercing process can be performed separately to each of the layers when the layers are being blanked, for example, or it can be performed to the layers simultaneously after they are adhered together during the optional stamping process, or it can be performed at another time and in another way.

In an exemplary laminate form manufacturing process, the first and second rigid layers can be initially provided in separate coiled rolls. As the individual coils are being uncoiled and brought together, the particular retention feature can be formed in the first and/or second rigid layer by a stamping process such as a coining, embossing, or another suitable process. Downstream of the retention feature forming step, the adhesive layer can be applied to the inner surface of the rigid layer by an exemplary roll-coating process, such as that described above, in which a roller is wheeled over the inner surface but does not paint adhesive material on the recessed features. The combined rigid/adhesive layer is then brought into contact with the inner surface of the other rigid layer so that the adhesive can harden, cure, and/or bond the layers together. As before, heat treatments, UV radiation, pressure application, anaerobic techniques and other known methods may be used to cure the adhesive layer. The now combined multi-layer assembly can be blanked into individual pieces or can be recoiled for shipping and subsequent processing. Like before, a piercing process or another suitable process can be performed in order to put one or more fastening holes in the first and second rigid layers. The piercing process can be performed separately to each of the layers as they are being brought together, for example, can be performed to the layers simultaneously after they are adhered together, or can be performed at another time and in another way.

It should be appreciated that the manufacturing process of the multi-layer assembly can vary in different embodiments in both the patch and laminate forms. For example, the above-described steps and processes can be performed at different times with respect to one another and need not all necessarily be performed, and additional steps and/or processes not described here can be performed as well. Furthermore, though described as used on the second rigid layer, any or all of the steps and processes could be used on the first rigid layer.

Referring to FIG. 4, a bolt 20 may be inserted into fastening hole 28 so that nut 22 can be threaded on the shaft of the bolt while the head of the bolt is placed over second rigid layer 16 above space 46. When the nut/bolt combination is tightened, first and/or second rigid layers 12, 16 are compressed together and collapse upon space 46 resulting in a metal-to-metal contact or interface 48 between inner surfaces 50, 52 of the first and second rigid layers. Side wall 42 may provide greater resistance to deformation than interior areas of retention feature 40 such that it does not collapse or only partially collapses, therefore space 46 can remain located adjacent thereto after tightening as shown in the figure. With the metal-to-metal interface and lack of adhesive, contraction of bolt 20 does not occur as much and the reduction of torque is prevented with the nut/bolt combination. A similar metal-to-metal interface may be formed in the other exemplary embodiments described, and is particularly shown in the third exemplary embodiment in FIG. 8.

Figure 13:
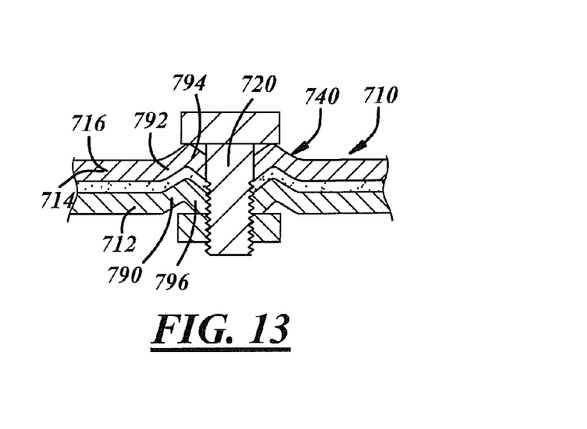
FIG. 13 is a cross-sectional view of another exemplary multi-layer assembly having a retention feature, where the retention feature is formed in both the first and second rigid layers.

In yet another exemplary embodiment shown in FIG. 13, retention feature 740 does not avoid application of adhesive layer 714 during the manufacturing process, as described above, but rather imparts enough rigidity and improved stiffness to first and second rigid layers 712, 716 to prevent the adhesive layer from being significantly squeezed and thus reduces the loss of torque related thereto. In the example shown, retention feature 740 is an annular-shaped rib-like protuberance formed in both first and second rigid layers 712, 716, giving the rigid layers outer side walls 790, 792 and inner side walls 794, 796. Of course, other shapes and structures are possible that perform a similar function to that performed by this example, including those shown and described in FIGS. 2, 10, 11, and 12. The manufacturing process of multi-layer assembly 710 can be similar to that described above. Here, adhesive layer 714 can be applied by other processes including spray coating, and retention feature 740 can be formed in multi-layer assembly 710 to both first and second rigid layers 712, 716 once adhesive layer 714 is cured by a stamping process such as coining, embossing, or another suitable process. In use, the head of bolt 720 extends laterally over both inner and outer side walls 790, 792, 794, 796 and exerts a tightening force directly over the side walls. The side walls resist the deformation that may otherwise occur in response to the tightening force of the nut/bolt combination, thus preventing or at least reducing the loss of torque in the combination.

It should be appreciated that any one of the preceding embodiments may be modified such that the retention feature is designed to receive a weld instead of a fastening device, like a nut/bolt combination. For example, the retention feature 40 shown in FIG. 3 may be modified by omitting fastening hole 28 and instead having a flat top wall 44 without any hole or opening formed in it. In such a case, flat top wall 44 may act as a welding surface and could include small indentations or other features for locating welding electrodes. After the multi-layer assembly 10 is formed, a resistance weld, spot weld or other type of weld could be formed at the retention feature such that top wall 44 is depressed and forced into first rigid layer 12, thereby forming a metal-to-metal interface 48 for the weld. The electrodes on a spot welder may be used to simultaneously form this depression and create the weld. Other techniques may be used as well.

Figures 14, 15:
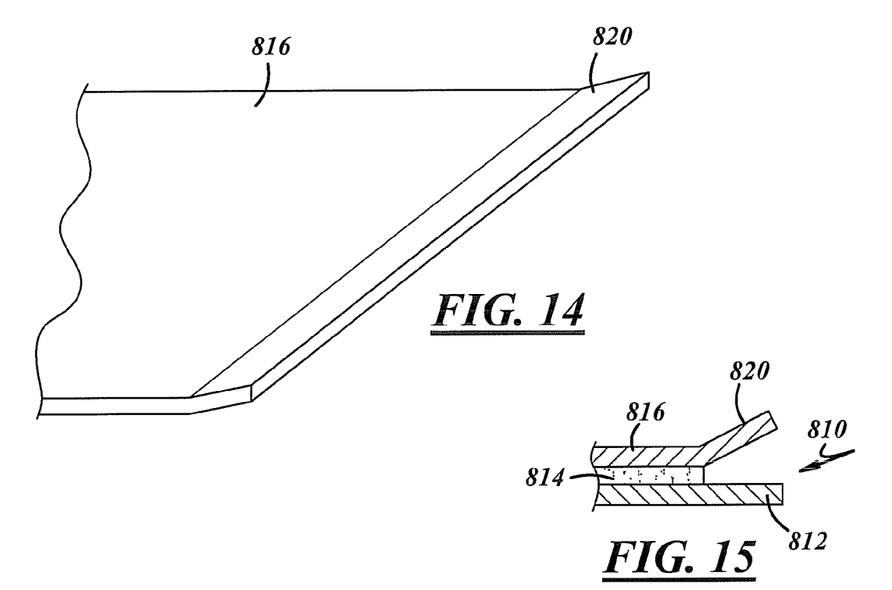
FIG. 14 is a perspective view of another exemplary multi-layer assembly having a retention feature, where the retention feature is formed along an edge of a rigid layer.
FIG. 15 is a cross-sectional view of the multi-layer assembly of FIG. 14.
Figures 16, 17:
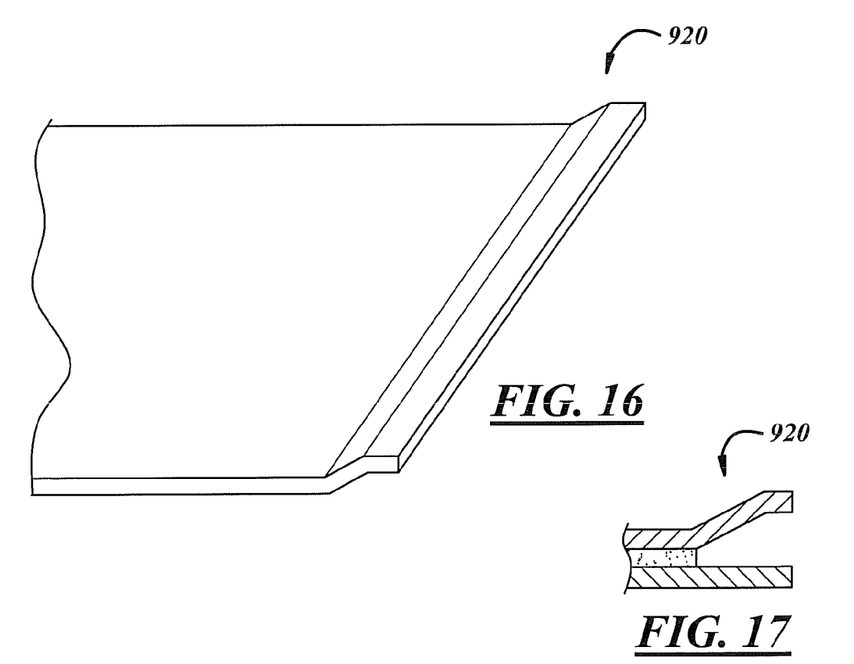
FIG. 16 is a perspective view of another exemplary multi-layer assembly having a retention feature, where the retention feature is again formed along an edge of a rigid layer and includes an additional flange.
FIG. 17 is a cross-sectional view of the multi-layer assembly of FIG. 16.

Turning now to FIGS. 14 and 15, there are shown several embodiments where retention features are formed along the edge of the rigid layers. Multi-layer assembly 810 includes first and second rigid layers 812, 816 and an adhesive layer 814 located therebetween. Instead of a traditional edge that is uniformly flush with the rest of the blank or material, second rigid layer 816 includes a retention feature 820—which in this case is a turned-up flange running along an edge of the rigid layers. Retention feature 820 is bent and extends upwards and away from the rest of the rigid layer in such a way that during an adhesive application process, adhesive is not deposited along the edge of the assembly (as shown in FIG. 14 in cross-section). After the adhesive is cured, the retention feature or turned-up flange 820 may be bent or otherwise forced back into alignment with the rest of the blank so that the edges can be fastened together. In one embodiment, the edges of the first and second rigid blanks 812, 816 are laser, mash seam, or otherwise welded together and because there is no intervening adhesive material in the area of the weld, the weld is not contaminated by the adhesive; a condition that can occur during laser welding when the laser melts the adhesive material so that the byproducts makes the weld undesirably porous. It should be appreciated that retention feature 820 is merely exemplary and that retention features having different shapes and configuration may be used instead. For example, the retention feature may: be rounded or curved instead of being a flat flange, extend a longer or shorter distance away from the flange that that shown here; include a compound bend such that a flat shelf-like extension 920 is formed at the edge (see FIG. 15); only extend along a portion of the overall length of the edge of the rigid layer, instead of extending along the entire length (e.g., the retention feature may only extend in that area of the edge where the weld is expected); it may be formed in both the first and second rigid layers instead of only being formed in one of the rigid layers; or it may extend in the interior of the rigid layers, as opposed to only extending along the edges. These are only some of the possibilities, as others are certainly possible.

It is to be understood that the foregoing description is not a definition of the invention itself, but is a description of one or more preferred exemplary embodiments of the invention. The invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "e.g.," "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A multi-layer assembly, comprising:
a first rigid layer with an inner surface;
a second rigid layer with an opposing inner surface;
an adhesive layer being in contact with the opposing inner surfaces of the first and second rigid layers such that the adhesive layer bonds the first and second rigid layers together; and
a retention feature being formed as a raised embossment in at least one of the first and second rigid layers and including a side wall, wherein the opposing inner surfaces of the first and second rigid layers diverge from one another at the retention feature such that the side wall at least partially defines a space formed between the opposing inner surfaces of the first and second rigid layers, and the space is devoid of adhesive from the adhesive layer.

2. The multi-layer assembly of claim 1, wherein each of the first and second rigid layers is a metal layer and has a thickness of about 0.10 mm-1.00 mm, inclusive.

3. The multi-layer assembly of claim 1, wherein the adhesive layer is a viscoelastic adhesive layer and has a thickness of about 0.005 mm -0.05 mm, inclusive.

4. The multi-layer assembly of claim 1, wherein the retention feature surrounds a fastening hole that extends through the entire multi-layer assembly.

5. The multi-layer assembly of claim 4, wherein the retention feature has at least one of the following configurations when viewed from a top-down perspective: circular, oval, square or rectangular.

6. The multi-layer assembly of claim 4, wherein the retention feature includes a top wall, and the side wall is connected to one of the first and second rigid layers at an outer radial end and is connected to the top wall at an inner radial end, and the top wall is connected to the side wall at an outer radial end and is adjacent the fastening hole at an inner radial end.

7. The multi-layer assembly of claim 6, wherein the side wall extends away from one of the first and second rigid layers and towards the top wall according to an angle $\alpha$ that is in a range from about 20°-90°, inclusive.

8. The multi-layer assembly of claim 6, wherein the top wall extends away from the side wall such that the top wall is generally parallel with at least one of the first and second rigid layers.

9. The multi-layer assembly of claim 6, wherein the retention feature further includes an inner side wall that is connected to the top wall at an outer radial end and extends towards one of the first and second rigid layers.

10. The multi-layer assembly of claim 1, wherein the retention feature surrounds a plurality of fastening holes where each fastening hole extends through the entire multi-layer assembly.

11. The multi-layer assembly of claim 1, wherein the retention feature surrounds a welding surface where the first and second rigid layers are welded together.

12. The multi-layer assembly of claim 1, wherein the raised embossment is a raised annular embossment that is formed in at least one of the first and second rigid layers and surrounds a flat center section, and a plurality of fastening holes extend through the raised annular embossment.

13. The multi-layer assembly of claim 1, wherein the raised embossment is a raised discontinuous embossment that is formed in at least one of the first and second rigid layers and surrounds a fastening hole that extends through the entire multi-layer assembly.

14. A multi-layer assembly, comprising:
a first rigid layer being made of metal and having an inner surface;
a second rigid layer being made of metal and having an inner surface;
an adhesive layer being in contact with the inner surfaces of the first and second rigid layers such that the adhesive layer bonds the first and second rigid layers together; and
a retention feature being formed in at least one of the first and second rigid layers and at least partially defining a space formed between the inner surfaces of the first and second rigid layers that is devoid of adhesive from the adhesive layer, wherein attachment of a fastening device in a fastening hole extending through the multi-layer assembly causes a deformation of the retention feature such that the inner surfaces of the first and second rigid layers contact each other and form a metal-to-metal interface that is at least partially located between the space devoid of adhesive and the fastening hole.

15. The multi-layer assembly of claim 14, wherein the retention feature is a raised embossment that is formed in at least one of the first and second rigid layers and surrounds a fastening hole that extends through the entire multi-layer assembly and accommodates the fastening device.

16. The multi-layer assembly of claim 15, wherein the retention feature includes a top wall, and a side wall is connected to one of the first and second rigid layers at an outer radial end and is connected to the top wall at an inner radial end, and the top wall is connected to the side wall at an outer radial end and is adjacent the fastening hole at an inner radial end.

17. The multi-layer assembly of claim 16, wherein the retention feature further includes an inner side wall that is connected to the top wall at an outer radial end and extends towards one of the first and second rigid layers.

18. The multi-layer assembly of claim 14, wherein a side wall extends away from the adhesive layer such that a space is formed between the first and second rigid layers and the space is devoid of adhesive from the adhesive layer.

19. The multi-layer assembly of claim 14, wherein the retention feature is a raised embossment that is formed in at least one of the first and second rigid layers and surrounds a plurality of fastening holes where each fastening hole extends through the entire multi-layer assembly and accommodates a separate fastening device.

20. The multi-layer assembly of claim 14, wherein the retention feature is a raised embossment that is formed in at least one of the first and second rigid layers and surrounds a welding surface where the first and second rigid layers can be welded together.

21. The multi-layer assembly of claim 14, wherein the retention feature is a raised annular embossment that is formed in at least one of the first and second rigid layers and includes a plurality of fastening holes that surround a flat center section.

22. The multi-layer assembly of claim 14, wherein the retention feature is a raised discontinuous embossment that is formed in at least one of the first and second rigid layers and surrounds a fastening hole extending through the entire multi-layer assembly.

* * * * *